US011991802B2

(12) United States Patent
De Wit et al.

(10) Patent No.: US 11,991,802 B2
(45) Date of Patent: May 21, 2024

(54) LED DRIVER CONTROL CIRCUIT

(71) Applicant: SIGNIFY HOLDING B.V., Eindhoven (NL)

(72) Inventors: Lino Adriaan Nicolaas Wilhelm De Wit, Eindhoven (NL); Casper Willem Johannes Kemper, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 226 days.

(21) Appl. No.: 17/617,352

(22) PCT Filed: Jun. 11, 2020

(86) PCT No.: PCT/EP2020/066174
§ 371 (c)(1),
(2) Date: Dec. 8, 2021

(87) PCT Pub. No.: WO2020/249662
PCT Pub. Date: Dec. 17, 2020

(65) Prior Publication Data

US 2022/0232680 A1 Jul. 21, 2022

(30) Foreign Application Priority Data

Jun. 14, 2019 (EP) .................................... 19180391

(51) Int. Cl.
*H05B 45/30* (2020.01)
*H05B 41/38* (2006.01)
*H05B 47/10* (2020.01)

(52) U.S. Cl.
CPC ............. *H05B 45/30* (2020.01); *H05B 41/38* (2013.01); *H05B 47/10* (2020.01)

(58) Field of Classification Search
CPC ........ H05B 45/30; H05B 41/38; H05B 47/10; H05B 45/37
USPC .......................................................... 315/291
See application file for complete search history.

(56) References Cited

U.S. PATENT DOCUMENTS 7,084,579 B2 * 8/2006 Konopka ............. H05B 41/282 315/307
10,448,537 B2 * 10/2019 Ito ......................... C07C 251/44
11,438,988 B1 * 9/2022 Hume ..................... H05B 45/37
11,743,990 B2 * 8/2023 Zijlman ............... H05B 47/155 315/291

(Continued)

*Primary Examiner* — Ryan Jager

(57) ABSTRACT

An LED driver control circuit suitable for a LED driver operating under the Line Switch dimming protocol. The LED driver control circuit generates a control signal that can switch between a voltage level at a first node and a voltage level at a second node. The first node is connected to a three-phase input by a first voltage control circuit and the second node is connected to the three-phase input a second voltage control circuit. The first voltage control circuit controls the voltage level at the first node to be, in a first embodiment, greater than or, in a second embodiment, less than a voltage level of each phase of the 3-phase input for at least part of a cycle of the respective phase. The second voltage control circuit controls the voltage level at the second node to be, in the first embodiment, less than or equal to or, in the second embodiment, greater than or equal to a voltage level of each phase of the 3-phase input for the entirety of the cycle of the respective phase.

15 Claims, 4 Drawing Sheets

(56) References Cited

U.S. PATENT DOCUMENTS

| | | | | |
|---|---|---|---|---|
| 2010/0308743 | A1* | 12/2010 | Liang | H05B 45/42 315/246 |
| 2011/0156614 | A1* | 6/2011 | Klier | H05B 41/42 315/294 |
| 2012/0249150 | A1* | 10/2012 | Anissimov | H05B 41/40 324/415 |
| 2012/0256547 | A1* | 10/2012 | Yang | H05B 45/3725 315/144 |
| 2014/0312797 | A1 | 10/2014 | Zanbaghi et al. | |
| 2014/0361703 | A1 | 12/2014 | Fornage et al. | |
| 2017/0238381 | A1* | 8/2017 | Ohno | C07C 251/44 204/157.71 |
| 2022/0232680 | A1* | 7/2022 | De Wit | H05B 45/37 |

* cited by examiner

LED DRIVER CONTROL CIRCUIT

CROSS-REFERENCE TO PRIOR APPLICATIONS

This application is the U.S. National Phase application under 35 U.S.C. § 371 of International Application No. PCT/EP2020/066174, filed on Jun. 11, 2020, which claims the benefit of European Patent Application No. 19180391.5, filed on Jun. 14, 2019. These applications are hereby incorporated by reference herein.

FIELD OF THE INVENTION

The present invention relates to the field of control circuits for LED drivers, and in particular to control circuits adapted to provide an isolated control signal to an LED driver.

BACKGROUND OF THE INVENTION

A light emitting diode (LED) arrangement, formed of a plurality of LEDs, is typically driven or powered by an LED driver. The LED driver may be adapted to define an amount of light output by the LED arrangement, e.g. by controlling a magnitude of current through LEDs of the LED arrangement.

Different methodologies or protocols for controlling the magnitude of a current through LEDs, i.e. dimming the LED arrangement, have been considered. Typically, these protocols have a common feature in that the LED driver controls the amount of light output by the LED arrangement responsive to a control signal provided by an LED driver control circuit.

One example of a methodology for dimming an LED arrangement is called "Line Switch". The Line Switch methodology is a step-dimming methodology in which a control signal is provided to the LED driver, wherein the control signal is switchable between two levels. The LED driver responds to a change in the level of the control signal by appropriating changing a level of the current through a connected LED arrangement between two non-zero (and typically predetermined) levels.

Other methods of controlling a dimming an LED arrangement are known, and include DALI, 1-10V, 0-10V and so on.

There is an ongoing desire to improve the adaptability of LED systems so that they are capable of connecting to different or new power sources or inputs. In particular, it is appreciated that the characteristics of different power sources (i.e. input) for an LED system may differ from a typical mains source for a domestic setting, e.g. for different jurisdictions or in industrial applications.

There is therefore a need to provide components of an LED system for use with such non-domestic power sources.

SUMMARY OF THE INVENTION

The invention is defined by the claims.

According to examples in accordance with an aspect of the invention, there is provided an LED driver control circuit. The LED drive control circuit is designed for generating a control signal for an LED driver connectable to a three-phase input comprising three different phase wires each carrying an alternating current signal of a same frequency and a different phase.

The LED driver control circuit comprises: a switch adapted to controllably connect a switch output node between a first switch input node and a second switch input node, a voltage of the switch output node defining the control signal; a first voltage control circuit connectable to at least one phase wire of the three-phase input and connected to the first switch input node and arranged to control a voltage at the first switch input node; and a second voltage control circuit connectable to at least one phase wire and connected to the second switch input node of the three-phase input and arranged to control a voltage at the second switch input node.

The first and second voltage control circuits are configured so that either: the voltage at the first switch input node is greater than an instantaneous voltage of each alternating current signal for a portion of the cycle of each respective alternating current signal and the voltage at the second switch input node is no greater than an instantaneous voltage of any alternating current signal at any point during the cycle of each respective alternating current signal; or the voltage at the first switch input node is less than an instantaneous voltage of each alternating current signal for a portion of the cycle of each respective alternating current signal and the voltage at the second switch input node is no less than an instantaneous voltage of any alternating current signal at any point during the cycle of each respective alternating current signal.

The present invention proposes a new LED driver control circuit suitable for generating a control signal for a (plurality of) LED driver(s) operating under the Line Switch dimming methodology. In particular, the proposed LED driver control circuit enables a Line Switch based LED driver to be powered by a three-phase mains input without the need to consider, at a time of installation, which of the phase wires (provided by the three-phase input) are connected to which power terminals of the LED driver and whilst maintaining the accuracy of the control signal.

This significantly increases an ease of installation of LED drivers (and their associated LED arrangements) to be connected to the LED driver control circuit.

The present invention thereby enables the LED driver and LED driver control circuit to be operated from a 3-phase input without a neutral wire (such as a 3-phase delta connection). This thereby obviates the need for a mains 3-phase input to provide a neutral wire for an LED driver, thereby reducing an amount of wiring used to power and control the LED driver. Existing lighting installations (e.g. to which the proposed technology can be retro-fitted) may already comprise wiring for providing three inputs of a mains as well as a neutral wire. In such scenarios, the neutral wire is no longer required for providing power to the LED driver (or LED driver control circuit) and may be used to carry the control signal generated by the LED driver control circuit. This enables a dimmable LED system to be retrofitted into existing lighting installations and improves a flexibility of the overall LED system.

It should be clear that the proposed LED driver control circuit is specifically adapted for use with the Line Switch dimming methodology, but may be implemented in the context of other similar dimming methodologies.

The first voltage control circuit may comprise a first diode connected from a first phase wire to the first switch input node; and a second diode connected from a second phase wire to the first switch input node.

In some embodiments, the first voltage control circuit further comprises a third diode connected from a third phase wire to the first switch input node. This third diode is not essential and may be omitted in some embodiments to reduce a size of the first voltage control unit.

The three-phase input may further comprise a neutral wire, wherein the first voltage control circuit comprises a first capacitor connected between the neutral wire and the first switch input node; and a diode connected between one of the phase wires and the first switch input node.

When a neutral wire is available for the LED driver control circuit, reliability of the voltage at the first switch input node may be increased by providing a capacitor connected between the first switch input node and the neutral wire. This smooths out the voltage provided at the first switch input node, increasing the time for which the voltage at the first switch input node is greater than a voltage at a neutral terminal of the LED driver. It also increases a flexibility of the LED driver circuit, only requiring connection to two wires of the three-phase input.

In a further embodiment, in addition to the first capacitor, the first voltage control circuit comprises three diodes, each diode connecting a respective phase wire of the three-phase input to the first switch input node.

In at least one embodiment, the second voltage control circuit comprises three diodes, each diode connecting the second switch input node to a respective phase wire of the three-phase input.

In at least one embodiment, the three-phase input further comprises a neutral wire and the second voltage control circuit comprises: a second capacitor connected between the neutral wire and the second switch input node; and a diode connected from the second switch input node to one of the phase wires of the three-phase input.

When a neutral wire is available for the LED driver control circuit, reliability of the voltage at the second switch input node may be increased by providing a capacitor connected between the second switch input node and the neutral wire. This smooths out the voltage provided at the second switch input node and reduces the likelihood that the voltage at the neutral terminal of the LED driver will rise to be greater than the voltage at the second switch input node (e.g. in the event of a power surge). It also increases a flexibility of the LED driver circuit, only requiring connection to two wires of the three-phase input (rather than all three).

There is also proposed an LED driver system comprising: any herein described LED driver control circuit; and an LED driver, for driving an LED arrangement, connectable to the three-phase input and responsive to the control signal generated by the LED driver control circuit.

Preferably, the LED driver system is adapted so that any LED drivers are not connected to a neutral wire (if present) of the three-phase input. The present invention enables LED drivers to be operated from only phase wires of the three-phase input, freeing up wire which may have been previously designated as a neutral wire (e.g. to carry a control signal for the LED driver control circuit). This improves an ease of retro-fitting the LED driver system into existing wiring schemes or lighting systems.

In embodiments, each LED driver comprises a control signal isolator adapted to receive the control signal and generate an isolated control signal based on a difference between the control signal and an alternating current signal carried by one of the phase wires.

In some embodiments, the control signal isolator comprises: a light emitting diode connected between the switch output node and one of the phase wires and adapted to generate light responsive to the voltage at the switch output node; and a light responsive circuit adapted to receive the light generated by the light emitting diode and generate the control signal. Thus, the control signal isolator may effectively comprise an opto-coupler arrangement.

In some embodiments, the control signal isolator further comprises a reverse current diode connected between the switch output node and the same one of the phase wires as the light emitting diode, wherein a polarity of the control diode is opposite to the polarity of the light emitting diode.

The LED driver is preferably adapted to control a current flowing through the LED arrangement responsive to the control signal. In particular, the LED driver may operate according to the Line Switch protocol responsive to the control signal.

There is also proposed an LED system comprising any herein described LED driver system; and an LED arrangement formed of one or more LEDs driven by the LED driver system.

There is also proposed an LED system comprising any described LED driver control circuit; a plurality of LED drivers, for driving a respective LED arrangement, connectable to the three-phase input and responsive to the control signal generated by the LED driver control circuit; and a plurality of LED arrangements driven by a respective LED driver, the number of LED arrangements being equal to the number of LED drivers.

Thus, different LED drivers may share a control signal generated by an LED driver control circuit.

According to examples in accordance with an aspect of the invention, there is provided a method of controlling a LED driver control circuit for generating a control signal for an LED driver connectable to a three-phase input comprising three different phase wires each carrying an alternating current signal of a same frequency and a different phase.

The method comprises: controllably connecting a switch output node between a first switch input node and a second switch input node; generating a control signal for the LED driver responsive to the voltage at the switch output node, wherein the control signal is electrically isolated from the switch output node; providing a voltage to the first switch input node using a first voltage control circuit connected between at least one phase wire of the three-phase input and the first switch input node; and providing a voltage to the second switch input node using a second voltage control circuit connected to the second switch input node and connectable to at least one phase wire of the three-phase input, wherein either: the provided voltage at the first switch input node is greater than an instantaneous voltage of each alternating current signal for a portion of the cycle of each respective alternating current signal and the provided voltage at the second switch input node is no greater than an instantaneous voltage of any alternating current signal at any point during the cycle of each respective alternating current signal; or the provided voltage at the first switch input node is less than an instantaneous voltage of each alternating current signal for a portion of the cycle of each respective alternating current signal and the provided voltage at the second switch input node is no less than an instantaneous voltage of any alternating current signal at any point during the cycle of each respective alternating current signal. These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
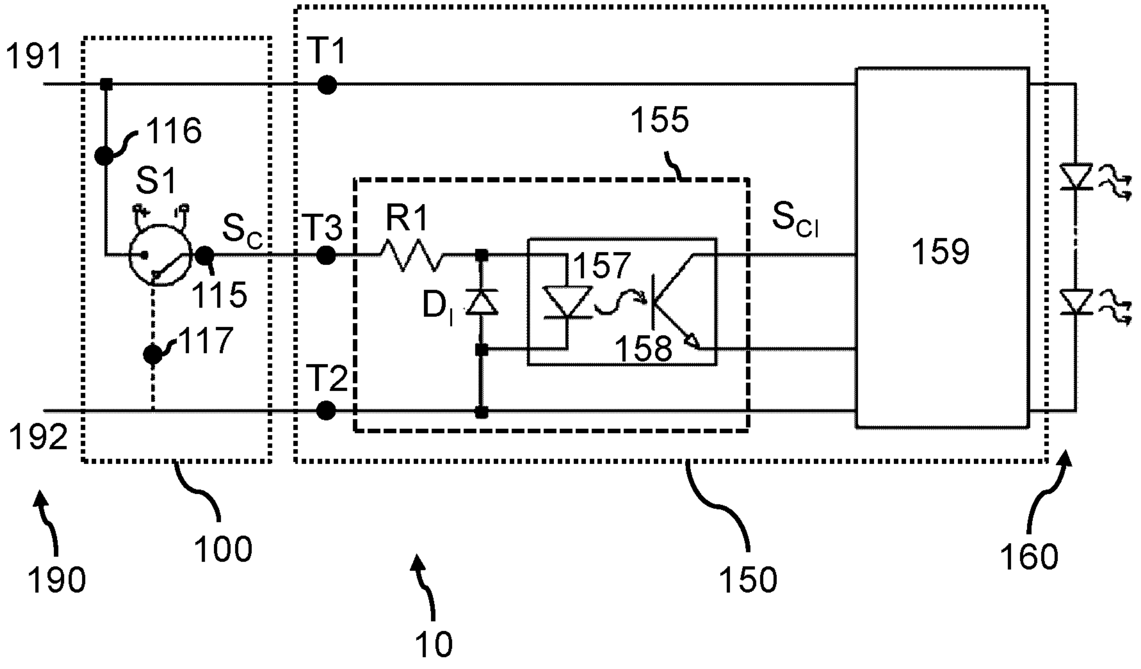
FIG. 1 illustrates an LED system having an LED driver control circuit according to a known example in the prior art.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an LED driver control circuit suitable for a LED driver operating under the Line Switch dimming protocol. The LED driver control circuit generates a control signal that can switch between a voltage level at a first node and a voltage level at a second node. The first node is connected to a three-phase input by a first voltage control circuit and the second node is connected to the three-phase input by a second voltage control circuit. The first voltage control circuit controls the voltage level at the first node to be, in a first embodiment, greater than or, in a second embodiment, less than a voltage level of each phase of the 3-phase input for at least part of a cycle of the respective phase. The second voltage control circuit controls the voltage level at the second node to be, in the first embodiment, less than or equal to or, in the second embodiment, greater than or equal to a voltage level of each phase of the 3-phase input for the entirety of the cycle of the respective phase.

The invention thereby provides an LED driver control circuit that enables an LED driver, operating under the Line Switch dimming protocol, to use any two of the three-phase inputs as a phase wire and a return path (i.e. acting as a neutral wire) whilst still being appropriately controlled.

FIG. 1 illustrates a known LED driver control circuit 100 in the context of an overall LED system 10. The LED system 10 also comprises an LED driver 150 and an LED arrangement 160, which is driven by driving components 159 of the LED driver 150. The LED driver control circuit 100 generates a control signal $S_C$ for use by the LED driver 150.

The LED driver 150 is adapted to operate according to the Line Switch interface scheme or dimming protocol. In this scheme, the LED driver 150 is energized from a mains input via a phase wire terminal T1 and a neutral wire terminal T2. The "Line Switch" interface scheme includes an extra input terminal T3 ("control terminal") for the LED driver (which acts as a control for the LED driver), and uses the neutral terminal as a shared return path for a control signal received at the extra input terminal.

Typically, in the Line Switch interface methodology, the control signal $S_C$ (received at the extra input terminal) is switchable between a first and second level, and the LED driver controls the current through a connected LED arrangement between a first and second (non-zero) current level responsive to the level of the control signal. This enables switchable and controllable dimming.

Accordingly, the LED driver control circuit 100 is adapted to generate the control signal $S_C$ for the extra input terminal T3 of the driver.

The LED driver 150 has three terminals T1, T2, T3 for connecting to three respective wires. A first terminal T1 and a second terminal T2 are connectable to a mains input 190, and therefore act as "power terminals". The first terminal T1 ("phase wire terminal") is connectable to draw power from a phase wire 191 of the mains input 190 (which may be alternatively labelled a "power wire", "hot wire", "driver wire" or "line"). The second terminal T2 ("neutral wire terminal") is connectable to a neutral wire 192 of the mains input, which acts as a return path for the LED driver, as is well known in the art. Thus, the mains input 190 provides two (transmission) wires for connection to terminals of the LED driver.

The LED driver 150 also comprises a third terminal T3 ("control terminal" or "Line Switch wire terminal") for receiving a control signal $S_C$ generated by an LED driver control circuit 100. The control signal $S_C$ is in accordance with the Line Switch interface methodology. In particular, the third terminal T3 is connectable to a switch output node 115 of the LED driver control circuit 100 that provides the control signal $S_C$, as will be later explained.

The LED driver 150 comprises a control signal isolator 155 that generates an isolated control signal $S_{CI}$. The control signal isolator receives the control signal $S_C$ and generates the isolated control signal $S_{CI}$ based on a difference between a voltage of the control signal $S_C$ and the voltage at the neutral wire or neutral wire terminal T2, i.e. a current through the control signal isolator 155. The control signal isolator 155 requires a return path for the control signal, which return path is provided by the neutral wire 192 connected to the second terminal T2. The isolated control signal $S_{CI}$ is thereby electrically isolated from the control signal $S_C$.

The LED driver 150 further comprises driving components 159 for driving the LED arrangement. The driving of the LED arrangement is sensitive or responsive to the isolated control signal $S_{CI}$, and thereby the control signal $S_C$. For example, the driving components may control a current through the LED arrangement responsive to the (isolated) control signal as previously explained.

The LED driver control circuit 100 comprises a switch S1 that controllably connects a switch output node 115 between a first switch input node 116 (connected to the phase wire 191) and a second switch input node 117 (connected to the neutral wire 192). The switching of S1 may be responsive to an external control signal or manually toggled, e.g. via a user interface (not shown). This effectively allows the switch S1 to switch the voltage at the switch output node (i.e. the control signal) between the voltage of the phase wire 191 and the voltage of the neutral wire 192.

In the illustrated prior art example, the control signal isolator 155 effectively comprises an opto-coupler arrangement that generates the isolated control signal $S_{CI}$ responsive to the control signal $S_C$. However, other methods of generating an isolated control signal $S_{CI}$ will be apparent to the skilled person (e.g. using a 1:1 transformer).

The control signal isolator 155 here comprises a light emitting diode 157 and a light responsive circuit 158 adapted to receive the light generated by the light emitting diode and generate the isolated control signal $S_{CI}$. The light emitting diode 157 emits light in response to current flowing therethrough, i.e. a voltage difference between the control terminal T3 and the neutral wire terminal T2.

The control signal isolator 155 also comprises a (reverse current) diode $D_1$ placed in parallel with the light emitting diode 157, but having an opposite polarity. A resistor R1 limits the current through the light emitting diode 157. This is because neither the light emitting diode 157 nor diode $D_1$ limit current, meaning that a resistor is preferred for limiting current through these components (e.g. if the neutral wire terminal T2 is connected to a low output impedance voltage).

It will be clear that when the switch S1 connects the switch output node 115 to the first switch input node, then a current will flow from the phase wire 191 through the resistor R1 and light emitting diode 157 and to the neutral wire 192. This will cause the light emitting diode to generate light, thereby resulting in the light responsive circuit generating an isolated control signal $S_{CI}$ having first characteristics (i.e. indicating that light was detected). The first characteristics may be the presence of (some) voltage/current in the isolated control signal.

When the switch S1 connects the switch output node to the second switch input node, then no current will flow through the light emitting diode 157. Thus, the light responsive circuit 158 will generate an isolated control signal having second characteristics (i.e. indicating that no light was detected). The second characteristics may be the absence of (some) voltage/current in the isolated control signal.

The control signal $S_C$ can thereby control the characteristics of the LED arrangement whilst allowing it to be electrically isolated from components that control the LED arrangement and the LED arrangement itself.

In particular, some current flowing (i.e. a voltage difference for a period of time) through the control signal isolator (from the switch output node to the neutral wire) results in an isolated signal having first characteristics being generated or output. No current flowing through the control signal isolator from the switch output node to the neutral wire, i.e. when there is no voltage across the control signal isolator, results in an isolated control signal having second characteristics being generated or output.

As briefly described above, the driving components 159 of the LED driver 150 respond to the characteristics of the isolated control signal $S_{CI}$ to control the LED arrangement 160.

It is known for the driving components 159 to control the current through the LED arrangement 160 to be at a first level in response to the isolated control signal having the first characteristics and to be at a second, different level in response to the isolated control signal having the second characteristics. Thus, the control signal $S_C$ (and thereby the switch S1) can effectively control a current through the LED arrangement 160. Methods of controlling an LED arrangement based on different signal characteristics of an isolated control signal are well known in the art.

In known examples, the second switch input node 117 is omitted from the LED driver control circuit 100, and the switch may (to result in a control signal having second characteristics being generated) instead disconnect the switch output node from the first switch input node (i.e. open the switch).

However, one problem with this approach is that current may still couple to the switch output node 115 from the phase wire 191, e.g. via parasitic capacitances, which may still cause current to flow through the control signal isolator and the isolated control signal to be erroneously generated. It is therefore preferable to enable the switch output node 115 to connect to the neutral wire 192 to generate the control signal with the second characteristics.

In known examples, it is possible to use the above-described LED driver 150 and LED driver control circuit 100 with a (industrial) 3-phase star (Y) input or power source, having three phase wires and a neutral wire, rather than the illustrated (domestic) power source having a single phase wire and neutral wire.

A three-phase input typically provides three phase wires, each wire carrying an alternating signal (i.e. a signal having an alternating current and alternating voltage), and a neutral wire (carrying a return path and/or representing ground or earth). An additional wire (not shown) may be provided in some embodiments, the additional wire providing a protective earth. The voltages/currents carried by the phase wires are substantially identical to one another (i.e. same frequency, peak magnitude, shape and so on), except that each voltage/current is 120° out of phase with the voltage/current carried by the other phase wires. Each alternating signal performs iterative and periodic cycles, e.g. in the manner of a sinusoidal wave.

In such a configuration, the phase wire terminal T1 of the LED driver 150 can be connected to anyone (or possibly more) of the three phase wires, each carrying a signal of a different phase (R,S,T), and the neutral wire terminal T2 can be connected to the neutral wire. For such a system, the corresponding LED driver control circuit can use any one of the three phase wires (for connecting to the first switch input node) and the neutral wire (for connecting to the second switch input node). The selection of the phase wire for the first switch input node can be independent of the selection of the input nodes used to power the LED driver.

The operation of the LED driver and LED driver control circuit operates in much the same way. In some example, a capacitor may be provided at the output of the light responsive circuit to smooth any ripple in the isolated control signal caused by the alternating current carried by the phase wire. This element is not, however, essential.

However, the inventors have recognized that in some applications, it is desirable to use an input or power source arranged in a 3-phase delta (Δ) configuration or other configuration in which no neutral wire is provided by the power source (or where the neutral wire is used for other purposes). For such power sources, the LED driver 150 can be connected to any two of the phase wires of the input source and be successfully powered (e.g. be capable of driving the LED arrangement 160). In particular, a phase wire terminal T1 of the LED driver may be connected to any of the three phase wires (R,S,T) and the neutral wire terminal T2 of the LED driver may be connected to any of the two other phase wires.

For ease of installation, it is preferable that the phase wire terminal T1 and the neutral wire terminal T2 of an LED driver 150 can be connected to an arbitrary selection of the available input lines.

However, the inventors have recognized that this causes a problem with the conventional LED driver control circuit 100, as it will be unknown (at the time of designing the LED driver control circuit) which of the available input lines will be connected to the neutral wire terminal of the LED driver. Moreover, different LED drivers may share a same control signal (e.g. have control terminals connected to a same switch output node of the LED driver control circuit), but be themselves connected to arbitrary/different input lines for powering themselves.

For example, if a neutral wire terminal of an LED driver is connected to a same phase wire as a first switch input node of the LED driver control circuit, then no isolated control signal will be generated by that LED driver when the switch S1 controls the switch output node to connect to the first switch input node (which would be in error compared to when implemented with a domestic mains supply).

Thus, in a scenario in which the control terminals T3 of multiple LED drivers connect to a same switch output node of the LED driver control circuit, but have their power/neutral wire terminals connected to an arbitrary two of the available input lines, this problem may result in erroneous behavior of the isolated control signal in certain LED drivers, and thereby erroneous behavior of at least one corresponding LED arrangement.

There is therefore a desire to provide an LED driver control circuit that is able to adapt to or be used with any configuration in which the LED drivers are connected to a three phase power source with no neutral wire or without using a neutral wire.

Figure 2:
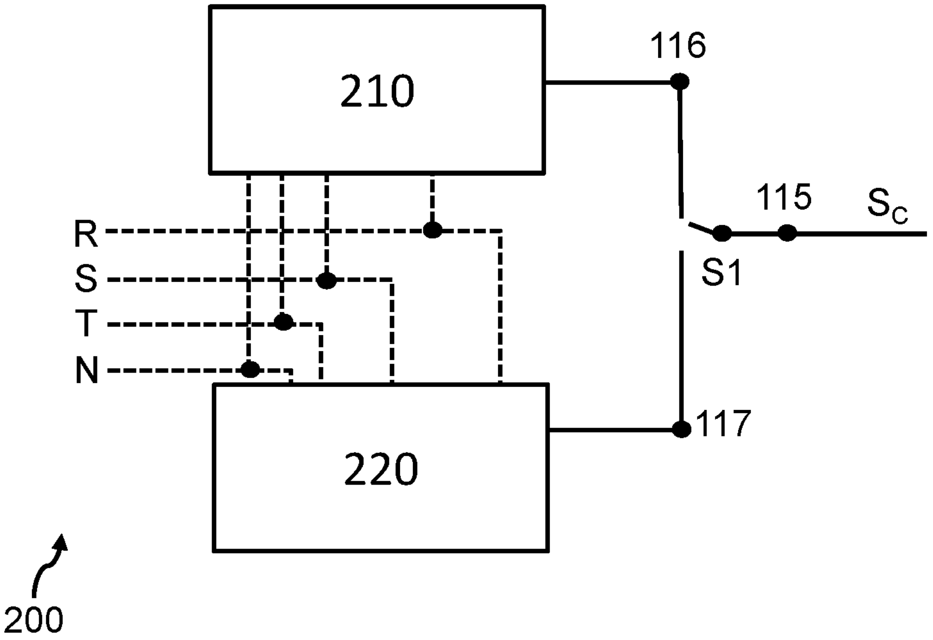
FIG. 2 illustrates an LED driver control circuit according to a generic embodiment of the invention.

FIG. 2 conceptually illustrates an LED driver control circuit 200 according to a generic embodiment of the invention. Instead of connecting the first/second switch input node directly to an available phase wire of the three-phase input, use of a first voltage control unit and a second voltage control unit is made to provide a voltage level to the first/second switch input nodes.

In particular, a first voltage control unit 210 provides a voltage to the first switch input node and a second voltage control unit 220 provides a voltage to the second switch input node.

The first voltage control circuit 210 is connected between at least one phase wire R, S, T of the three-phase input and the first switch input node 116. The first voltage control circuit 210 is arranged so that the voltage at the first switch input node 116 is greater than an instantaneous voltage of each alternating current signal (carried by each respective phase wire) for a portion of the cycle of each respective alternating current signal.

In other words, the first voltage control circuit 210 is designed so that, for at least a portion of the cycle of each of the signals provided by the available phase wires, the voltage at the first switch input node is greater than an instantaneous voltage of said signal(s). This means that, for at least part of the cycle of an alternating signal carried by any given phase wire, at least some current will flow through the control signal isolator of a connected LED driver when the switch output node is connected to the first switch input node, irrespective as to which phase wire the neutral terminal of the LED driver is connected.

The second voltage control circuit 220 is connected to the second switch input node 117 and connectable to at least one phase wire R, S, T of the three-phase input. The second voltage control circuit 220 is arranged so that the voltage at the second switch input node is no greater than an instantaneous voltage of any alternating current signal at any point during the cycle of any of the alternating current signals.

In other words, the second voltage control circuit is designed so that the voltage at the second switch input node is always less than or equal to an instantaneous/momentary voltage of each alternating signal carried by the phase wires. This means that at no point during the cycle of any of the signals on the phase wires will current flow through the control signal isolator of the LED driver, irrespective as to which phase wire the neutral terminal of the LED driver is connected.

The first and/or second voltage control circuits 210, 220 may be connected to a neutral wire N of the three-phase input. This neutral wire N may be made unavailable to LED drivers controlled by the LED driver control circuit. Specific embodiments using this concept will be explained in further detail below.

In other examples, the first and second voltage control circuit may be adapted so that the voltage at the first switch input node is less than an instantaneous/momentary voltage of each alternating current signal for a portion of the cycle of each respective alternating current signal and the voltage at the second switch input node is no less than an instantaneous voltage of any alternating current signal at any point during the cycle of each respective alternating current signal. Methods of achieving this will be later described.

Figure 3:
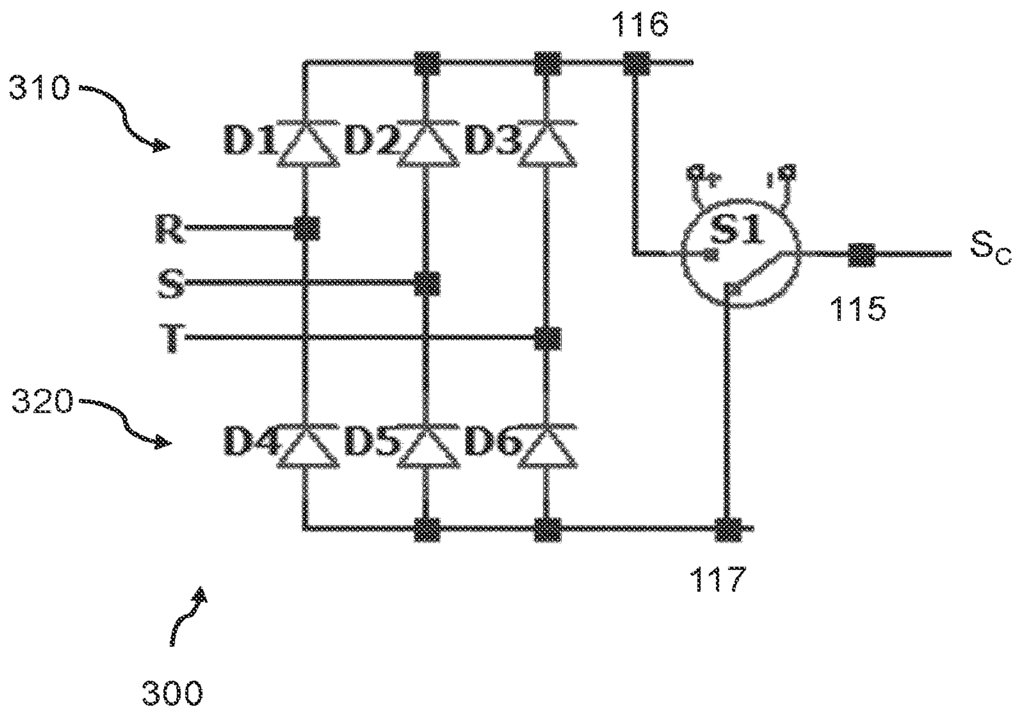
FIG. 3 illustrates an LED driver control circuit according to a first embodiment.

FIG. 3 illustrates an LED driver control circuit 300 according to a first embodiment of the invention.

The LED driver control circuit 300 comprises the switch S1, which selectively connects a switch output node 115 to the first 116 and/or second 117 switch input node. The LED driver control circuit further comprises a first 310 and second 320 voltage control circuit.

The first voltage control circuit 310 comprises a first D1, second D2 and third diode D3 connected from each respective phase wire R, S, T of the three-phase input to the first switch input node 116. In particular, the anodes of each diode D1, D2, D3 are connected to a respective phase wire R, S, T, with the cathode of each diode being connected to the same first switch input node 116.

This effectively means that the voltage at the first switch input node 116 is no less than the highest momentary voltage of each phase wire R, S, T. This ensures that the voltage at the first switch input node is greater than the momentary voltage of each phase wire for at least part of the cycle of each signal on the respective phase wires. In other words, there is a positive voltage difference between the first switch input node 116 and each phase wire R, S, T for at least a portion of the cycle of a signal carried by the respective phase wire R, S, T.

This results in, when the switch output node 115 is connected to the first switch input node 116, current flowing through the control signal isolator of a connected LED driver 150 for at least part of a cycle of an alternating signal carried by any of the phase wires, irrespective as to which of the phase wires the neutral terminal T2 of the LED driver 150 is connected.

The second voltage control circuit 320 comprises a fourth D4, fifth D5 and sixth D6 connected from the second switch input node to each respective phase wire R, S, T of the three-phase input. In particular, the cathode of each diode D4, D5, D6 is connected to a respective phase wire R, S, T with the anode of each diode being connected to the same second switch input node 117.

This effectively means that the voltage at the second switch input node is no greater than the lowest momentary voltage of each phase wire. This results in, when the switch output node is connected to the second switch input node, no current will flow through the control signal isolator of a connected LED driver at any point during the mains cycle, irrespective as to which of the phase wires the neutral terminal of the LED driver is connected.

Figure 4:
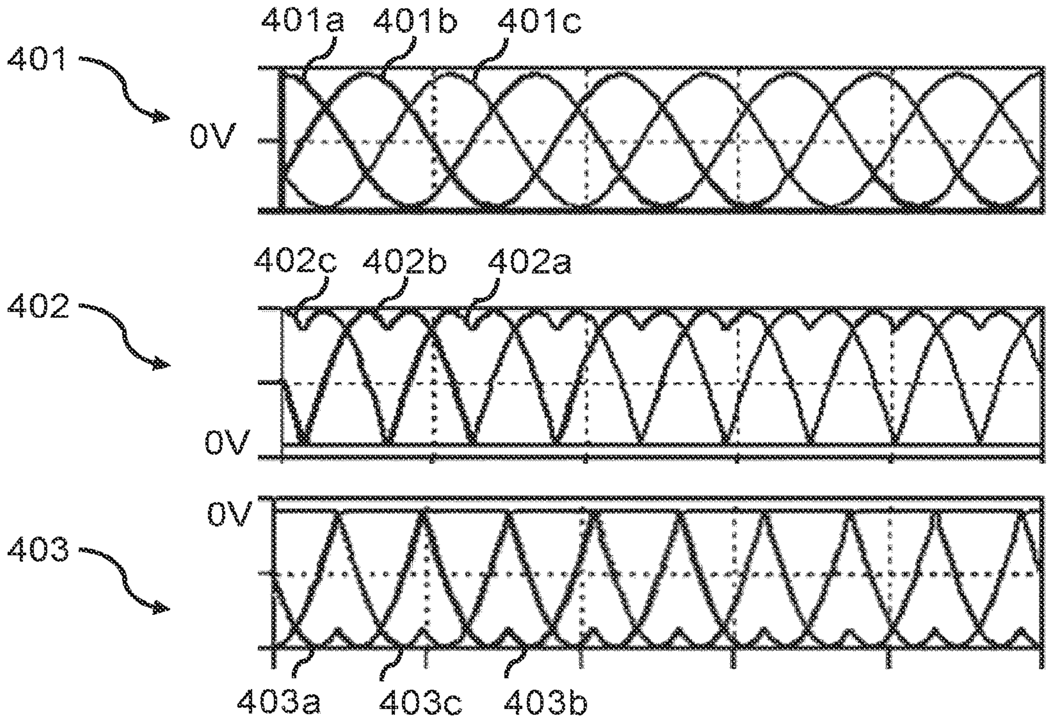
FIG. 4 illustrates waveforms for elucidating the LED driver control circuit according to the first embodiment.

FIG. 4 provides three illustrative waveforms for the LED driver control circuit according to the first embodiment.

A first waveform 401 illustrates the voltage at each phase wire R, S, T of a three-phase input. A first line 401*a* illustrates a voltage difference between a first phase wire R and a second phase wire S. A second line 401*b* illustrates a voltage difference between the second phase wire S and a third phase wire T. A third line 401*c* illustrates a voltage difference between the third phase wire T and the first phase wire R.

A second waveform 402 illustrates the voltage at the first switch input node 116 relative to the voltage of each respective phase wire R, S, T for an LED driver control circuit 300 of the first embodiment. A first line 402*a* illustrates a voltage difference between the first switch input node 116 and the first phase wire R. A second line 402*b* illustrates a voltage difference between the first switch input node 116 and the second phase wire S. A third line 402*c* illustrates a voltage difference between the first switch input node 116 and the third phase wire T.

Thus, it is apparent that whichever of the phase wires R, S, T the LED driver's neutral terminal is connected to, a voltage at the control terminal T3 (connected to the switch output node 115) will always be greater than a voltage at the neutral terminal T2 during at least part of the cycle of the alternating current provided to the neutral terminal, when the switch output node 115 is connected to the first switch input node 116. Thus, current will flow through the control signal isolator at this time.

A third waveform 403 illustrates the voltage at the second switch input node 117 relative to the voltage of each respective phase wire R, S, T for an LED driver control circuit 300 of the first embodiment. A first line 403*a* illustrates a voltage difference between the second switch input node and the first phase wire R. A second line 403*b* illustrates a voltage difference between the second switch input node and the second phase wire S. A third line 403*c* illustrates a voltage difference between the second switch input node and the third phase wire T.

Thus, it is apparent that whichever of the phase wires the neutral terminal T2 of the LED driver is connected to, the control terminal T3 (connected to the switch output node 115) will always be less than or equal to the voltage at the neutral terminal T2. Thus, no current will flow through the control signal isolator when the switch output node 115 of the LED driver control circuit (and thereby control terminal T2) is connected to the second switch input node 117.

In a variation to the LED driver control circuit 300 of the first embodiment, one of the diodes D1, D2, D3 may be removed from the first voltage control unit 310.

Thus, in a second embodiment, the first voltage control circuit 310 may comprise only a first D1 and second D2 diode connected from a respective phase wire (R, S) of the three-phase input to the first switch input node. In particular, the anodes of each diode are connected to a respective phase wire (R, S), with the cathode of each diode being connected to the same first switch input node.

In the second embodiment, the structure of the switch and the second voltage control circuit may be otherwise identical to that of the first embodiment.

Figure 5:
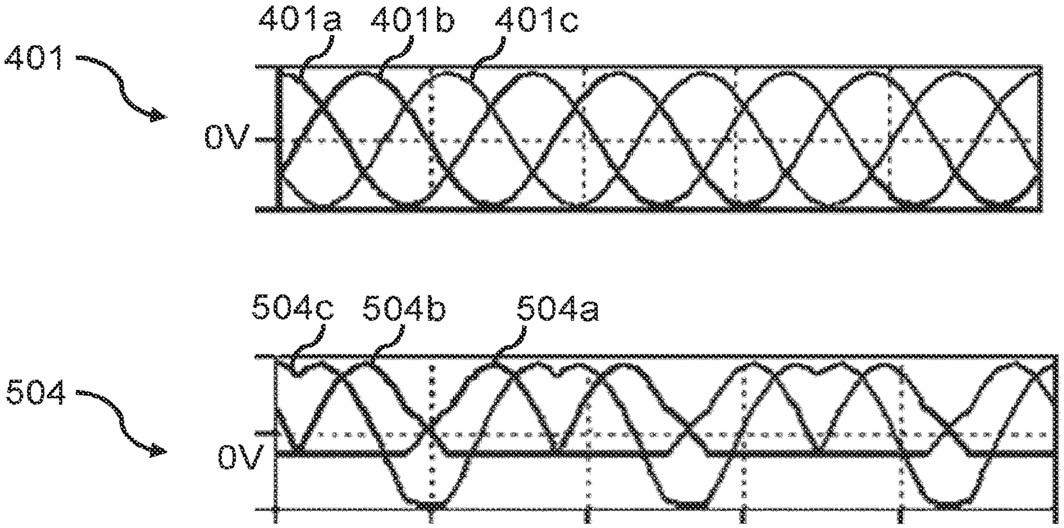
FIG. 5 illustrates waveforms for elucidating the LED driver control circuit according to a second embodiment.

FIG. 5 provides two waveforms for understanding the effect of the LED driver control circuit according to the second embodiment.

The first waveform 401 is repeated for the sake of improved clarity.

A fourth waveform 504 illustrates the voltage at the first switch input node 116 relative to the voltage of each respective phase wire R, S, T for an LED driver control circuit of the second embodiment. A first line 504*a* illustrates a voltage difference between the first switch input node and the first phase wire R. A second line 504*b* illustrates a voltage difference between the first switch input node and the second phase wire S. A third line 504*c* illustrates a voltage difference between the first switch input node and the third phase wire T.

As can be seen from the fourth waveform 504, the voltage between the first switch input node 116 and each input line R, S, T is positive during a portion of each cycle of an alternating signal carried by any given input line R, S, T. Thus, irrespective of which input line R, S, T is connected to the neutral terminal of the LED driver, the control terminal T3 (connected to the switch output node 115) will always be positive relative to the neutral terminal T2 during a portion of each cycle of the alternating signal at the neutral terminal. Thus, current will flow through the control signal isolator for at least a portion of the mains cycle.

It is noted that the fact that the voltage between the switch output node and one of the input lines is negative during part of the mains cycle is not objectionable.

In further embodiments, the neutral wire may still be available for connection to the LED driver control circuit (e.g. but not to the LED driver itself). The above-described embodiments of the LED driver control circuit are suitable for use in such scenarios. However, the availability of the neutral wire provides flexibility and scope for further improving the LED driver control circuit.

Figure 6:
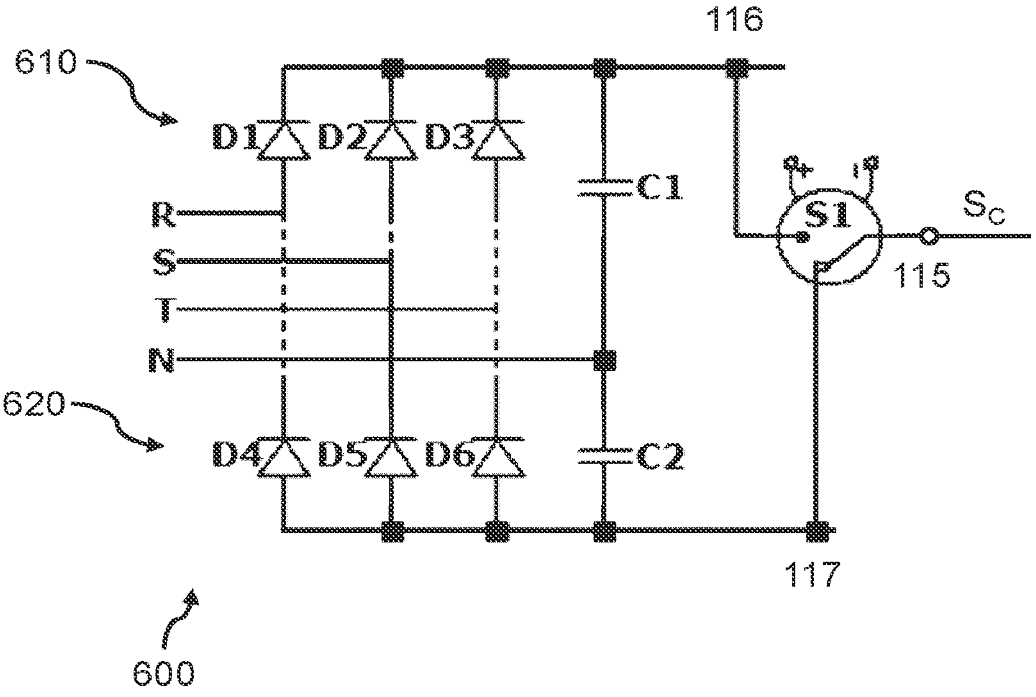
FIG. 6 illustrates an LED driver control circuit according to a third embodiment.

FIG. 6 illustrates an LED driver control circuit 600 according to a third embodiment of the invention. The third embodiment of the LED driver control circuit 600 is specifically adapted for use when three phase wires R, S, T and a neutral wire N are available for connection to the LED driver control circuit 600.

The LED driver control circuit 600 comprises the switch S1, which selectively connects a switch output node to the first and/or second switch input node. The LED driver control circuit 600 further comprises a first voltage control circuit 610 and a second voltage control circuit 620.

The first voltage control circuit 610 comprises a first diode D1, a second diode D2 and a third diode D3, in a similar manner to the first embodiment. In particular, the anodes of each diode are connected to a respective phase wire R, S, T, with the cathode of each diode being connected to the same first switch input node.

The first voltage control circuit 610 further comprises a first capacitor C1. The first capacitor C1 is connected between the neutral wire N and the first switch input node 116.

Provision of the first capacitor C1 means that a positive voltage is stored and maintained at the first switch input node 116 (by the first capacitor). This results in there being a positive voltage difference between the first switch input node 116 and each phase wire R, S, T for at least a portion of each cycle of an alternating signal carried by any of the respective phase wires. In turn, this means that there is a positive voltage difference between the control terminal of a connected LED driver and a neutral terminal of that LED driver for at least a portion of the cycle of the signal carried at the neutral terminal (or any of the phase wires), when the switch output node is connected to the first switch input node.

The capacitor C1 results in the voltage at the first switch input node being smoother than in previously described embodiments.

The second voltage control circuit 620 comprises a fourth diode D4, a fifth diode D5 and a sixth diode D6, in a similar manner to the first embodiment. In particular, the anodes of each diode are connected to the second switch input node 117, with the cathode of each diode being connected to a respective phase wire R, S, T.

The second voltage control circuit 610 further comprises a second capacitor C2. The second capacitor C2 is connected between the neutral wire N and the second switch input node 117.

Provision of the second capacitor C2 means that a negative voltage is stored at the second switch input node 117 (by the second capacitor). This helps ensure that the voltage difference between the second switch input node and any of the phase wires (or neutral wire) remains at or less than zero. In particular, the average voltage difference is increased, due to the smoothing effect of the capacitor. In turn, this means that there is always a negative or zero voltage difference between the control terminal of a connected LED driver and a neutral terminal of that LED driver irrespective as to which of the input/neutral wires the neutral wire terminal is connected, when the switch output node is connected to the second switch input node.

In a variation to the third embodiment, it is noted that only one of the first, second and third diodes of the first voltage control circuit is necessary to achieve the effect of ensuring that there is a positive voltage difference between the first switch input node and each phase wire for at least a portion of the cycle of a signal carried by the respective phase wire. This is because the first capacitor can store and maintain a positive voltage that will be greater than a portion of the cycle of the signal carried by each phase wire. Thus, one/two of the first, second and third diodes may be omitted according to various embodiments. This embodiment also provides the option to only require two (or possibly three) transmission wires (one of the phase wires and the neutral wire) to the LED driver control circuit.

In another variation to the third embodiment, it is noted that only one of the first, second and third diodes of the second voltage control circuit is necessary to achieve the effect of ensuring that a voltage difference between the first switch input node and each phase wire is zero or negative for the entire cycle of a signal carried by the respective phase wire. This is because the second capacitor can store and maintain a negative voltage (between the second switch input node and the neutral wire) that will be less than or equal to any instantaneous voltage of a signal carried by each phase wire, provided that a sufficiently large capacitance value is selected for the second capacitor. Thus, one/two of the fourth, fifth and sixth diodes may be omitted according to various embodiments.

Various examples for the first and second voltage control circuit have been described in accordance with embodiments (and variations thereof) of the invention. The skilled person would be readily capable of using different examples of the first and second voltage control circuit, from different embodiments and their variations. For example, one possible embodiment of the invention employs a first voltage control circuit described with reference to the first embodiment (e.g. as described with reference to FIGS. 3 and 4) and a second voltage control circuit described with reference to the third embodiment (e.g. as described with reference to FIG. 6).

The embodiments described with reference to FIGS. 3 to 6 are designed for providing a voltage at the first switch input node that is greater than an instantaneous/momentary voltage of each alternating current signal for a portion of the cycle of each respective alternating current signal and a voltage at the second switch input node that is no greater than an instantaneous/momentary voltage of any alternating current signal at any point during the cycle of each respective alternating current signal.

However, the described embodiments may be adapted so that the voltage at the first switch input node is less than an instantaneous/momentary voltage of each alternating current signal for a portion of the cycle of each respective alternating current signal and the voltage at the second switch input node is no less than an instantaneous/momentary voltage of any alternating current signal at any point during the cycle of each respective alternating current signal. This can be achieved by simply reversing the polarity of any diodes in the embodiments of the LED driver control circuits, i.e. replacing references to "anode" with "cathode" and vice versa.

For such embodiments, the LED driver described with reference to FIG. 1 may be adapted so that the polarity of the light emitting diode 157 and the (reverse) diode D1 are reversed. This would result in the isolated control signal having a same polarity as the embodiments described with reference to FIGS. 3 to 6.

Figure 7:
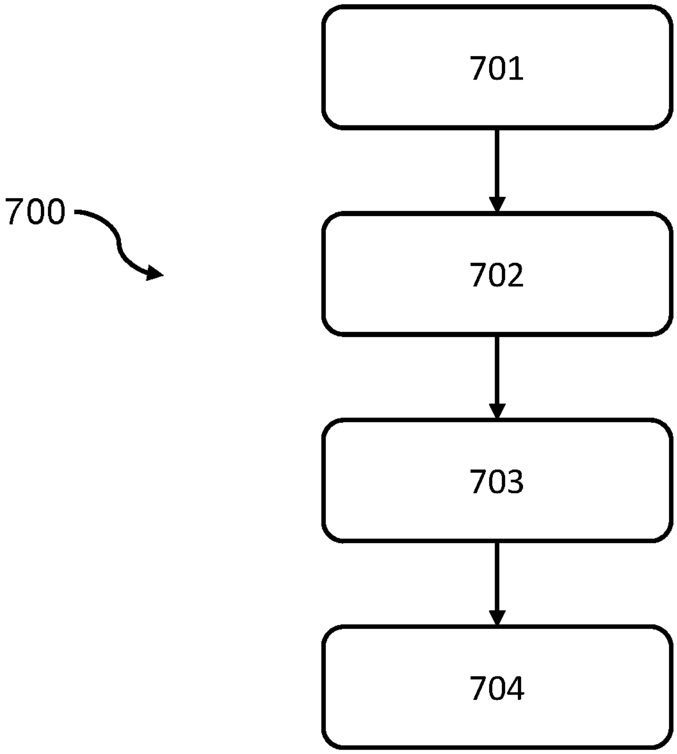
FIG. 7 illustrates a method of controlling an LED driver control circuit according to an embodiment of the invention.

FIG. 7 illustrates a method 700 according to an embodiment of the invention. The method is adapted for controlling a LED driver control circuit for generating a control signal for an LED driver connectable to a three-phase input comprising three different phase wires each carrying an alternating current signal of a same frequency and a different phase.

The method 700 comprises a first step 701 of controllably connecting a switch output node between a first switch input node and a second switch input node.

The method 700 also comprises a second step 702 of generating a control signal for the LED driver responsive to the voltage at the switch output node, wherein the control signal is electrically isolated from the switch output node.

The method 700 also comprises a third step 703 of providing a voltage to the first switch input node using a first voltage control circuit connected between at least one phase wire of the three-phase input and the first switch input node.

The method 700 also comprises a fourth step 704 of providing a voltage to the second switch input node using a second voltage control circuit connected to the second switch input node and connectable to at least one phase wire of the three-phase input.

The third 703 and fourth 704 steps are adapted so that either: the provided voltage at the first switch input node is greater than an instantaneous voltage of each alternating current signal for a portion of the cycle of each respective alternating current signal and the provided voltage at the second switch input node is no greater than an instantaneous voltage of any alternating current signal at any point during the cycle of each respective alternating current signal; or the provided voltage at the first switch input node is less than an instantaneous voltage of each alternating current signal for a portion of the cycle of each respective alternating current signal and the provided voltage at the second switch input node is no less than an instantaneous voltage of any alternating current signal at any point during the cycle of each respective alternating current signal.

The skilled person would be readily capable of adapting the above-described method to appropriately control the LED driver control circuit to carry out any herein described concept, e.g. as described with reference to FIGS. 2 to 6.

The skilled person would be readily capable of developing a processing system for carrying out any herein described method. Thus, each step of the flow chart may represent a different action performed by a processing system, and may be performed by a respective module of the processing system.

Embodiments may therefore make use of a processing system. The processing system can be implemented in numerous ways, with software and/or hardware, to perform the various functions required. A processor is one example of a processing system which employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Examples of processing system components that may be employed in various embodiments of the present disclosure include, but are not limited to, conventional microprocessors, application specific integrated circuits (ASICs), and field-programmable gate arrays (FPGAs).

In various implementations, a processor or processing system may be associated with one or more storage media such as volatile and non-volatile computer memory such as RAM, PROM, EPROM, and EEPROM. The storage media may be encoded with one or more programs that, when executed on one or more processors and/or processing systems, perform the required functions. Various storage media may be fixed within a processor or processing system or may be transportable, such that the one or more programs stored thereon can be loaded into a processor or processing system.

It will be understood that disclosed methods are preferably computer-implemented methods. As such, there is also proposed the concept of computer program comprising code means for implementing any described method when said program is run on a processing system, such as a computer. Thus, different portions, lines or blocks of code of a computer program according to an embodiment may be executed by a processing system or computer to perform any herein described method. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A LED driver control circuit arranged to generate a control signal for a plurality of LED drivers connectable to a three-phase input comprising three different phase wires each carrying an alternating current signal of a same frequency and a different phase, the LED driver control circuit comprising:

a switch adapted to controllably connect a switch output node at different times between a first switch input node and a second switch input node, a voltage of the switch output node defining the control signal;

a first voltage control circuit arranged to be connected between at least one phase wire of the three-phase input and the first switch input node and arranged to control a voltage at the first switch input node; and a second voltage control circuit arranged to be connected to the second switch input node and to at least one phase wire of the three-phase input and arranged to control a voltage at the second switch input node, wherein the first and second voltage control circuits are configured so that either:

the voltage at the first switch input node is greater than an instantaneous voltage of each alternating current signal for a portion of the cycle of each respective alternating current signal and the voltage at the second switch input node is no greater than an instantaneous voltage of any alternating current signal at any point during the cycle of each respective alternating current signal; or the voltage at the first switch input node is less than an instantaneous voltage of each alternating current signal for a portion of the cycle of each respective alternating current signal and the voltage at the second switch input node is no less than an instantaneous voltage of any alternating current signal at any point during the cycle of each respective alternating current signal.

2. The LED driver control circuit of claim 1, wherein the first voltage control circuit comprises:

a first diode connected from a first phase wire (R) to the first switch input node; and a second diode connected from a second phase wire to the first switch input node.

3. The LED driver control circuit of claim 2, wherein the first voltage control circuit further comprises a third diode connected from a third phase wire to the first switch input node.

4. The LED driver control circuit of claim 1, wherein the three-phase input further comprises a neutral wire, wherein the first voltage control circuit comprises:

a first capacitor connected between the neutral wire and the first switch input node; and a first diode connected between one of the phase wires and the first switch input node.

5. The LED driver control circuit of claim 4, wherein the first voltage control circuit comprises a second diode and a third diode, the first diode, the second diode, and the third diode connecting a respective phase wire of the three-phase input to the first switch input node.

6. The LED driver control circuit of claim 4, wherein the second voltage control circuit comprises:

a second capacitor connected between the neutral wire and the second switch input node; and a diode connected from the second switch input node to one of the phase wires of the three-phase input.

7. The LED driver control circuit of claim 1, wherein the second voltage control circuit comprises three diodes, each diode connecting the second switch input node to a respective phase wire of the three-phase input.

8. An LED driver system comprising:

the LED driver control circuit of claim 1; and an LED driver of the plurality of LED drivers, for driving an LED arrangement, connectable to the three-phase input and responsive to the control signal generated by the driver control circuit.

9. The LED drive system of claim 8, wherein the LED driver comprises a control signal isolator adapted to receive the control signal and generate an isolated control signal based on a difference between the control signal and an alternating current signal carried by one of the phase wires, wherein the isolated control signal is isolated from components that control the LED arrangement.

10. The LED driver system of claim 9, wherein the control signal isolator comprises:

a light emitting diode connected between the switch output node and one of the phase wires and adapted to generate light responsive to the voltage at the switch output node; and a light responsive circuit adapted to receive the light generated by the light emitting diode and generate the control signal.

11. The LED driver system of claim 10, wherein the control signal isolator further comprises a reverse current diode connected between the switch output node and the same one of the phase wires as the light emitting diode, wherein a polarity of the control diode is opposite to the polarity of the light emitting diode.

12. The LED driver system of claim 8, wherein the LED driver is adapted to control a current flowing through the LED arrangement responsive to the control signal.

13. An LED system comprising:

the LED driver system of claim 8; and an LED arrangement (160) formed of one or more LEDs driven by the LED driver system.

14. An LED system comprising:

the LED driver control circuit of claim 1;

the plurality of LED drivers, for driving a respective LED arrangement, connectable to the three-phase input and responsive to the control signal generated by the LED driver control circuit; and a plurality of LED arrangements driven by a respective LED driver, the number of LED arrangements being equal to the number of LED drivers.

15. A method of controlling a LED driver control circuit for generating a control signal for a plurality of LED drivers connectable to a three-phase input comprising three different phase wires each carrying an alternating current signal of a same frequency and a different phase, the method comprising:

controllably connecting a switch output node at different times between a first switch input node and a second switch input node;

providing a voltage to the first switch output node using a first voltage control circuit connected between at least one phase wire of the three-phase input and the first switch input node; and providing a voltage to the second switch input node using a second voltage control circuit connected to the second switch input node and connectable to at least one phase wire of the three-phase input, wherein either:

the provided voltage at the first switch input node is greater than an instantaneous voltage of each alternating current signal for a portion of the cycle of each respective alternating current signal and the provided voltage at the second switch input node is no greater than an instantaneous voltage of any alternating current signal at any point during the cycle of each respective alternating current signal; or the provided voltage at the first switch input node is less than an instantaneous voltage of each alternating current signal for a portion of the cycle of each respective alternating current signal and the provided voltage at the second switch input node is no less than an instantaneous voltage of any alternating current signal at any point during the cycle of each respective alternating current signal.

* * * * *